(12) United States Patent
Kobayashi et al.

(10) Patent No.: US 8,000,029 B2
(45) Date of Patent: Aug. 16, 2011

(54) LENS POSITION DETECTING DEVICE AND LENS POSITION DETECTING METHOD

(75) Inventors: Kuniyoshi Kobayashi, Osaka (JP); Masahiro Murakami, Kyoto (JP); Osafumi Moriya, Osaka (JP)

(73) Assignee: Panasonic Corporation, Osaka (JP)

( * ) Notice: Subject to any disclaimer, the term of this patent is extended or adjusted under 35 U.S.C. 154(b) by 248 days.

(21) Appl. No.: 12/336,774

(22) Filed: Dec. 17, 2008

(65) Prior Publication Data
US 2009/0161233 A1 Jun. 25, 2009

(30) Foreign Application Priority Data
Dec. 19, 2007 (JP) ................. 2007-326913

(51) Int. Cl.
*G02B 15/14* (2006.01)
(52) U.S. Cl. ........................ 359/697; 359/698
(58) Field of Classification Search .......... 359/694–704, 359/811–824
See application file for complete search history.

(56) References Cited

U.S. PATENT DOCUMENTS
4,412,737 A * 11/1983 Iwanade et al. ................. 355/55
5,144,491 A * 9/1992 Ushiro et al. ................. 359/697
5,179,409 A * 1/1993 Kazami et al. ................. 355/75
5,847,874 A * 12/1998 Sasao et al. ................. 359/554

FOREIGN PATENT DOCUMENTS
JP  2001-324664  11/2001
* cited by examiner

*Primary Examiner* — Mohammed Hasan
(74) *Attorney, Agent, or Firm* — Wenderoth, Lind & Ponack, L.L.P.

(57) ABSTRACT

A lens position detecting device includes a lens, a lens driver for moving the lens in the optical axis direction, a lens drive command unit for outputting a drive command to the lens driver, a position detector for detecting that the lens is located at a predetermined position, and a first reference position detector that moves the lens to a first position upon starting a detecting operation, receives an output signal from the position detector while moving the lens in one direction along the optical axis direction from the first position, and detects a reference position of the lens based on the output signal.

7 Claims, 11 Drawing Sheets

LENS POSITION DETECTING DEVICE AND LENS POSITION DETECTING METHOD

BACKGROUND OF THE INVENTION

1. Field of the Invention

The present invention relates to lens position control in an imaging apparatus such as a video camera and a digital still camera.

2. Related Art

In general, a lens device having a zooming function and a focusing function used in a video camera and a digital still camera has a structure which moves respective units, such as a zooming lens unit and a focusing lens unit, disposed inside a lens barrel independently along an optical axis to adjust focus and the like.

Figure 12:
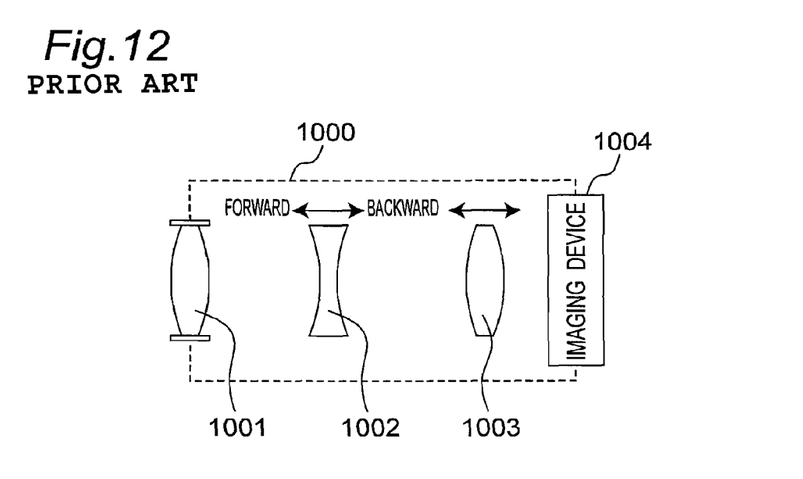
FIG. 12 is a diagram showing a structure of a lens system.

FIG. 12 shows one example of a structure of a lens system. A fixed lens 1001 is secured to a lens barrel 1000. A zoom lens 1002 having a function for adjusting the zoom magnification and a focusing lens 1003 having a focus-adjusting function are allowed to move inside the lens barrel 1000 in parallel with an optical axis. Optical information inputted through the respective lenses 1001, . . . is inputted to an imaging device 1004. Here, the lens that is moved in parallel with the optical axis (zoom lens 1002 or focusing lens 1003) is defined as a lens unit. In order to move the lens unit to a target position, it is necessary to accurately detect a reference position that is used as a reference for controlling the movement. For this reason, conventionally, various reference position detecting methods have been developed.

For example, with respect to the reference position detection, there are proposed a method using a non-contact type sensor, such as a photo-interrupter and a Hall element and a method using a contact-type sensor, such as a leaf switch (for example, JP-A-2001-324664). A conventional reference position detecting method using a light-shielding member attached to the lens unit and the photo-interrupter is described below.

Figure 13:
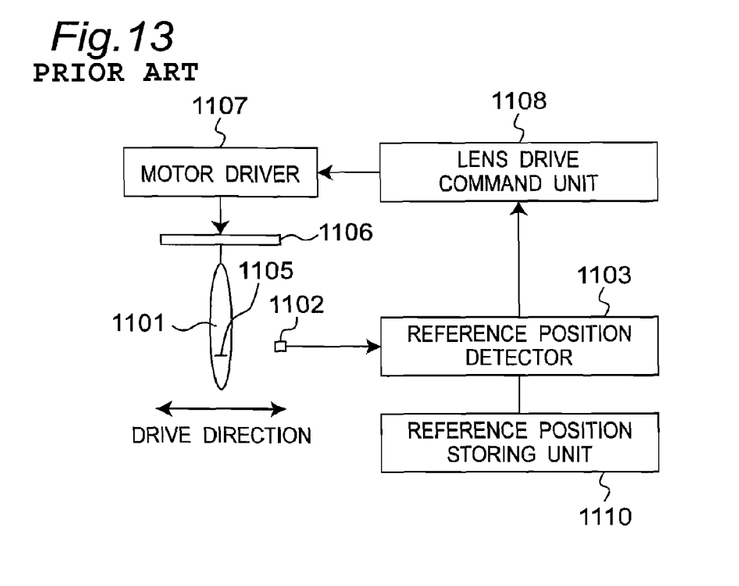
FIG. 13 is a block diagram showing a conventional position detecting device.

FIG. 13 is a block diagram showing a position-detecting device for a lens unit, which uses a photo-interrupter. A lens unit 1101 is moved in an optical axis direction by a driving motor 1106. The driving motor 1106 is driven by a motor driver 1107. The reference position of the lens unit 1101 is detected by a reference position detector 1103 by using a signal from a photo-interrupter 1102. A light-shielding member 1105 is attached to the lens unit 1101. The light-shielding member 1105 traversing the photo-interrupter 1102 allows the position of the lens unit 1101 to be detected.

A lens drive command unit 1108 outputs a command for driving a lens (referred to as "a lens drive command") to the motor driver 1107 in accordance with the lens drive command value provided by the reference position detector 1103. The reference position detected by the reference position detector 1103 is stored in a reference position storing unit 1110.

Figure 14A:
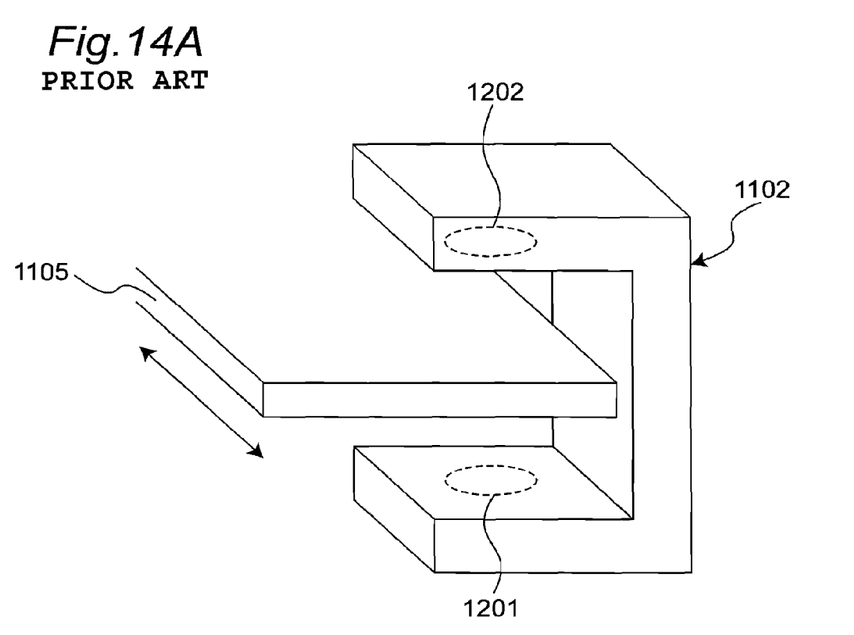
FIG. 14A is a view showing the outline of a photo-interrupter.

FIG. 14A shows detail configuration of the photo-interrupter 1102 and the light-shielding member 1105. The photo-interrupter 1102 includes a light-emitting element 1201 and a light-receiving element 1202. The photo-interrupter 1102 is disposed at a predetermined position defining a reference position. When the lens unit 1101 is moved along the optical axis in parallel therewith, the light-shielding member 1105 attached to the lens unit 1101 is moved together with the lens unit 1101. When the light-shielding member 1105 crosses the space between the light-emitting element 1201 and the light-receiving element 1202, the light emitted from the light-emitting element 1201 to the light-receiving element 1202 is shielded by the light-shielding member 1105 so that the output signal level of the photo-interrupter 1102 is changed. The reference position of the lens unit 1101 is detected by monitoring the change in the output signal level of the photo-interrupter 1102.

Figure 14B:
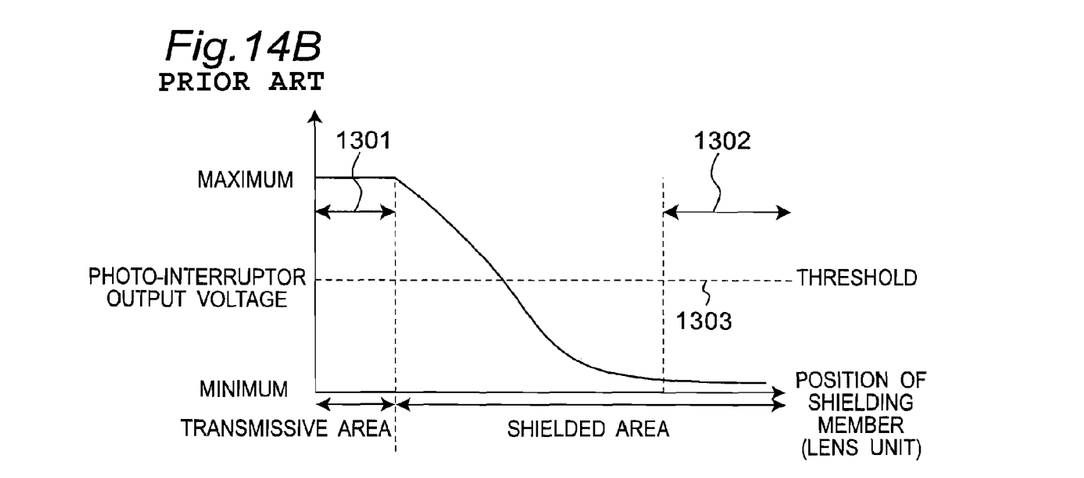
FIG. 14B is a diagram showing change in an output signal level of the photo-interrupter.

FIG. 14B shows a change in the output signal level of the photo-interrupter 1102. In this Figure, in a state where the light-shielding member 1105 is not located between the light-emitting element 1201 and the light-receiving element 1202 (hereinafter, referred to as a "complete transmissive state (1301)"), the output voltage of the photo-interrupter 1102 has a maximum value. After the light-shielding member 1105 is moved from the complete transmissive state (area 1301) by driving the lens unit 1101, and when the light-shielding member 1105 starts crossing the space between the light-emitting element 1201 and the light-receiving element 1202, the output voltage of the photo-interrupter 1102 starts dropping. When the light-shielding member 1105 comes to a state (hereinafter, referred to as a "complete shield state (area 1302)") which completely shields the light emitted from the light-emitting element 1201 to the light-receiving element 1202, the output voltage of the photo-interrupter 1102 has a minimum value. The area 1301 forming the complete transmissive state is referred to as a "complete transmissive area", and the area 1302 forming the complete shield state is referred to as a "complete shield area".

Suppose that a state in which the output signal level of the photo-interrupter 1102 exceeds a predetermined threshold value 1303 is referred to as "H" and a state in which the output signal level of the photo-interrupter 1102 is less than the predetermined threshold value 1303 is referred to as "L". The threshold value 1303 is set to a level between the output signal level of a complete transmissive state (1301) and the output signal level of a complete light-shield state (1302). The reference position detector 1103 continuously monitors the state of the output signal level of the photo-interrupter 1102 during a period from the start of the reference position detection until the reference position has been fixed. In response to a change in the state of the output signal level of the photo-interrupter 1102 thus acquired, the reference position detector 1103 calculates and sets a lens drive command value, and transmits the lens drive command value to the lens drive command unit 1108. A reference position of the lens is fixed to a position at which the output signal level of the photo-interrupter 1102 switches from "L" to "H".

The reference position of the lens unit 1101 needs to be determined accurately. Therefore, conventionally, the lens unit 1101 is moved in two directions, that is, from the fixed lens 1001 side (hereinafter, referred to as "forward") as well as from the imaging device 1004 side (hereinafter, referred to as "backward"), relative to the attached position of the photo-interrupter 1102 so as to detect the reference position. By carrying out the reference position detection in the two directions, that is, forward and backward, it is possible to accurately detect the reference position even when the stop position of the lens unit 1101 is undesirably shifted due to an external influence such as an impact.

However, in the above-mentioned structure in which the reference position detection is carried out in two directions, that is, forward and backward, it takes much time to fix or determine the reference position. Moreover, when it takes much time to detect the reference position as described above, a problem arises in which there is a delay in activating an imaging apparatus such as a video camera and a digital still camera.

The present invention has been devised so as to solve the above-mentioned problems, and its objective is to provide a position detecting device capable of reducing time required for detecting the reference position and detecting the reference position accurately even upon occurrence of an external influence such as an impact.

SUMMARY OF THE INVENTION

In a first aspect of the invention, a lens position detecting device is provided, including a lens movable in an optical axis direction, a lens driver that moves the lens in the optical axis direction, a lens drive command unit for outputting a drive command to the lens driver, a position detector for detecting that the lens is located at a predetermined position, and a first reference position detector that moves the lens to a first position upon starting a detecting operation, receives an output signal from the position detector while moving the lens in one direction along the optical axis direction from the first position, and detects a reference position of the lens based on the output signal.

In a second aspect of the invention, a lens position detecting device is provided, including a lens movable in an optical axis direction, a lens driver that moves the lens in the optical axis direction, a lens drive command unit for outputting a drive command to the lens driver, a position detector for detecting that the lens is located at a predetermined position, a reference position detector that receives an output signal from the position detector while moving the lens in the optical axis direction, to detect a reference position of the lens based on the output signal, and a reference position corrector that corrects the reference position of the lens based on the detected reference position and the command value of the lens drive command unit.

In a third aspect of the invention, a method for detecting a lens position in a lens driving device comprising a lens movable in an optical axis direction and a lens driver for moving the lens in the optical axis direction is provided. The method comprising moving the lens to a predetermined stop position, while moving the lens from the stop position in one direction along the optical axis direction, receiving an output signal from a position detector capable of detecting that the lens is located at a predetermined position, and detecting a reference position of the lens based on the output signal.

In a fourth aspect of the invention, a method for detecting a lens position in a lens driving device comprising a lens movable in an optical axis direction and a lens driver for moving the lens in the optical axis direction is provided. The method includes, while moving the lens in an optical axis direction, receiving an output signal from a position detector capable of detecting that the lens is located at a predetermined position, and detecting a reference position of the lens based on the output signal, and correcting the reference position of the lens, based on the detected reference position and a command value of the lens driver.

According to the present invention, it is possible to reduce the time required for the reference position detection. Moreover, it becomes possible to surely detect the reference position even upon occurrence of an external influence such as an impact.

Moreover, the present invention corrects a reference position that has been detected by moving the lens in an optical axis direction, and thus an accurate reference position can be obtained. Therefore, it is possible to find a lens reference position with high precision without stopping the lens, and consequently to obtain a lens reference position at high speeds with high precision.

With those advantages described above, the present invention makes it possible to achieve a high-speed activation of an imaging apparatus or system such as a video camera and a digital still camera.

DETAIL DESCRIPTION OF THE INVENTION

Referring to attached drawings, preferred embodiments of the present invention are described below

First Embodiment

1. Configuration of Lens Position Detecting Device

Figure 1:
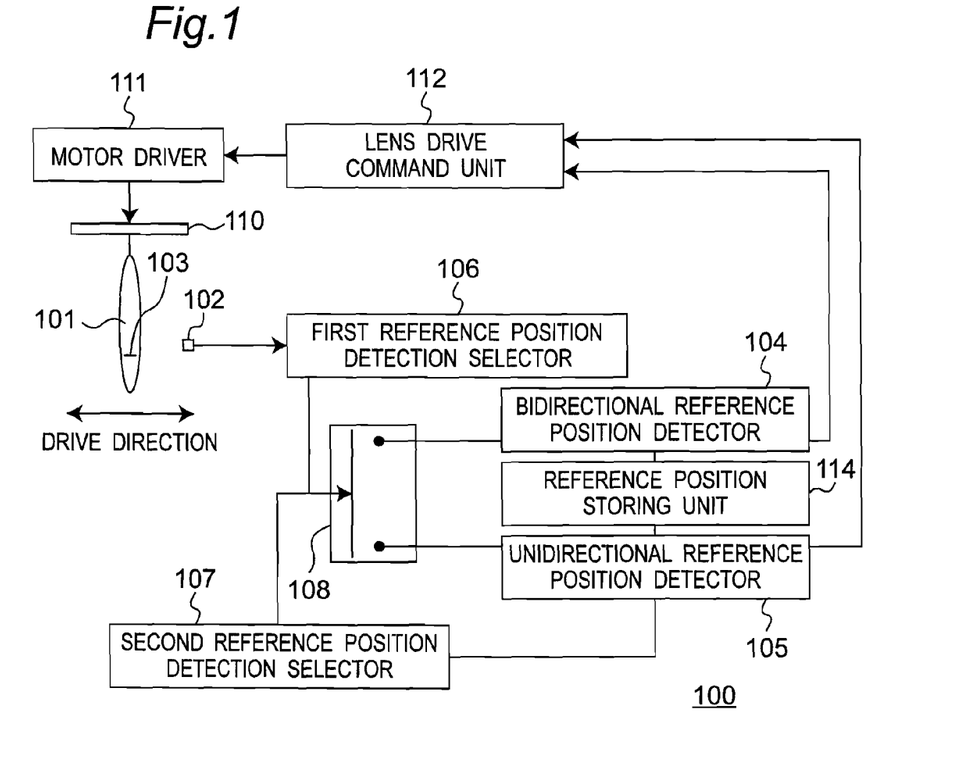
FIG. 1 is a block diagram showing an imaging apparatus including a position detecting device in accordance with a first embodiment of the present invention.

FIG. 1 shows a configuration of an imaging apparatus including a lens position detecting device in accordance with a first embodiment of the present invention. The imaging apparatus includes a lens unit 101, a driving motor 110, a motor driver 111 and a lens position detecting device 100.

The lens position detecting device 100 detects a reference position of the lens unit 101. The lens unit 101 is moved in an optical axis direction by the driving motor 110, and the driving motor 110 is driven by the motor driver 111. A stepping motor, a linear motor, a DC motor or the like may be used as the driving motor 110. The structure of the lens system including the lens unit 101 is the same as that shown in FIG. 12. A light-shielding member 103 and a photo-interrupter 102 attached to the lens unit 101 are used for a reference position detecting process. The structure of the photo-interrupter 102 and the output signal level of the photo-interrupter 102 are already described before with reference to FIG. 14. Instead of the photo-interrupter 102, another position detector may be used as long as it outputs a signal that varies in response to a physical position of the lens unit 101.

The lens position detecting device 100 includes a bidirectional reference position detector 104 that carries out a reference position detection bidirectionally and a unidirectional reference position detector 105 that carries out a reference position detection only in one direction. The lens position detecting device 100 is further provided with a first reference position detection selector 106 that selects the reference position detector to be operated, and a second reference position detection selector 107 that determines which of the reference position detectors is to be operated. Moreover, the lens position detecting device 100 includes a reference position detection switcher 108 that makes either one of the bidirectional reference position detector 104 and the unidirectional reference position detector 105 operate based on the result of determination made by the first reference position detection selector 106 and the second reference position detection selector 107.

The lens position detecting device 100 is further provided with a lens drive command unit 112 and a reference position storing unit 114. The lens drive command unit 112 provides a lens drive command to the motor driver 111 in accordance with a lens drive command value set by the bidirectional reference position detector 104 or the unidirectional reference position detector 105. The reference position storing unit 114 stores a reference position that has been determined by the bidirectional reference position detector 104 or the unidirectional reference position detector 105.

Upon starting a reference position detecting operation, the first reference position detection selector 106 determines which reference position detector should be operated as the reference position detector to be operated, out of the bidirectional reference position detector 104 or the unidirectional reference position detector 105. The second reference position detection selector 107 determines whether a switching should be made from the unidirectional reference position detector 105 to the bidirectional reference position detector 104, during a detecting operation of a reference position by the unidirectional reference position detector 105. The reference position detection switcher 108 activates the selected reference position detector in accordance with the command from the first reference position detection selector 106 and the second reference position detection selector 107.

2. Reference Position Detecting Operation

The reference position detecting operation of the lens unit 101 using the lens position detecting device 100 of the present embodiment is described below.

Figure 2:
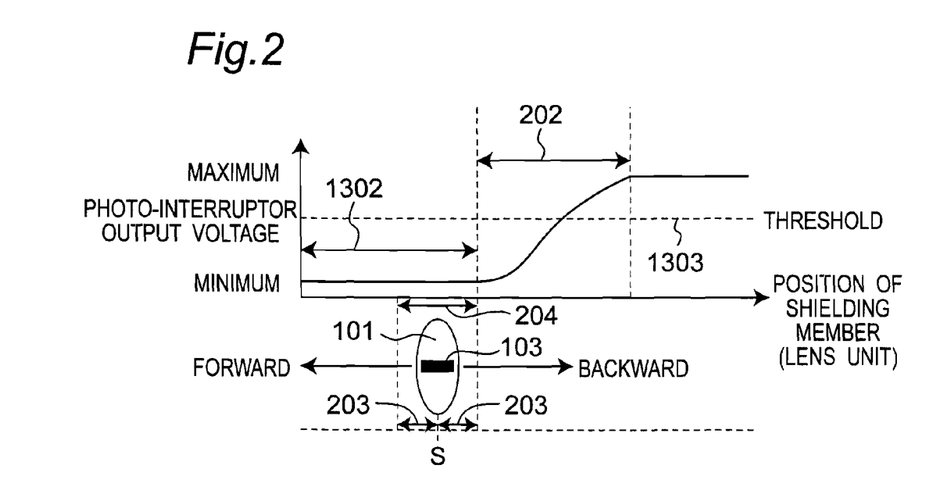
FIG. 2 is a diagram for explaining a stop position of a lens unit prior to activation of the position detecting device in accordance with the first embodiment.

In the lens position detecting device 100 of the present embodiment, upon activation of the lens position detecting device 100, the lens unit 101 is set to a predetermined stop position. Referring to FIG. 2, the stop position of the lens unit 101 is described below.

As shown in FIG. 2, a predetermined stop position S is disposed within a range where the output signal level of the photo-interrupter 102 is completely set to "L", that is, within a complete shield area 1302, taking into consideration that there is an indefinite range 202 of the output signal level of the photo-interrupter 102 (indefinite range whether it is an "H" state or an "L" state). Moreover, the stop position S is placed at a specific position within the complete shield area 1302, by taking into consideration of a specific distance 203 which provides no influence to the output signal level of the photo-interrupter 102 even when a positional deviation of the stop position of the lens unit 101 occurs due to an orientation difference and a shape change in the lens unit member occurs due to its temperature characteristics. Moreover, the stop position S may be moved forward within the specific distance 203 due to an orientation difference and temperature characteristics, or the like. In this case, the range in which the stop position S can take is defined as a valid range 204 of the lens unit stop position.

Figure 3:
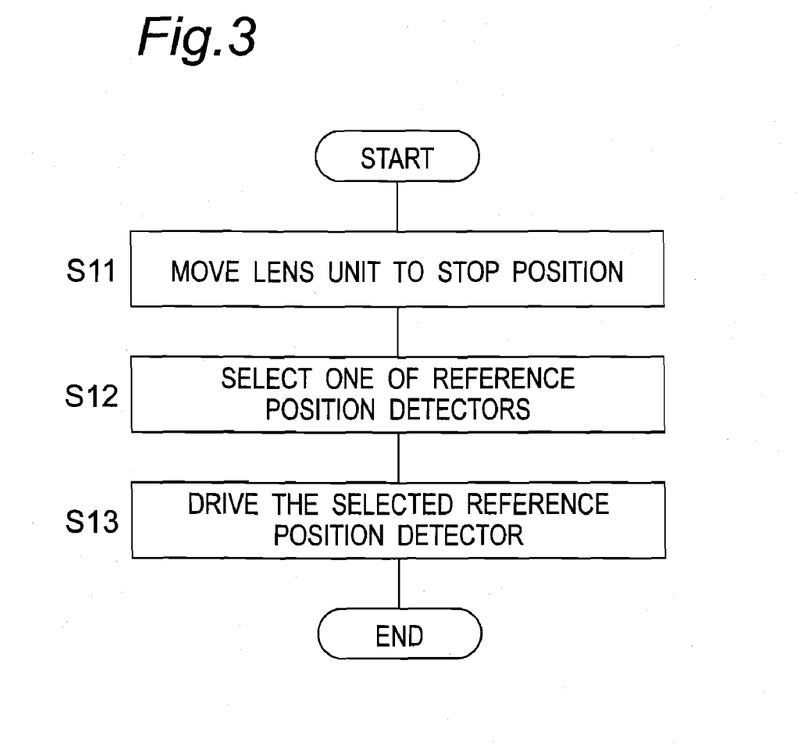
FIG. 3 is a flow chart showing the entire operations of the position detecting device (first embodiment).

FIG. 3 shows a main flow of reference position detecting operations by the reference position detecting device 100.

Upon activation of the lens position detecting device 100, the lens drive command unit 112 moves the lens unit 101 to a predetermined stop position (S11). After the lens unit 101 has been moved to the stop position, the first reference position detection selector 106 determines whether the bidirectional reference position detector 104 or the unidirectional reference position detector 105 should be selected as the reference position detector to be operated (S12). This determining operation will be described later in detail. Thereafter, the reference position detection switcher 108 drives the selected reference position detector (S13) in accordance with the command from the first reference position detection selector 106 (S13). Thus, the selected reference position detector starts reference position detecting operation.

2.1 First Selection of Reference Position Detector

Figure 4:
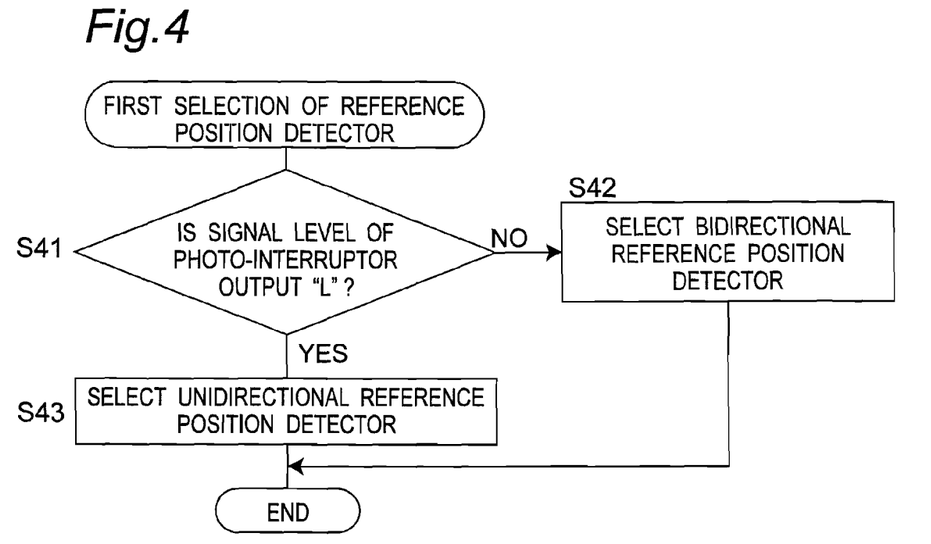
FIG. 4 is a flow chart showing operation of a first reference position detection selector.

Referring to a flow chart of FIG. 4, the determining operation (step S12) by the first reference position detection selector 106 is described in detail.

Upon starting the determination by the first reference position detection selector 106, the lens unit 101 is supposed to be normally stopped at the stop position S where the output signal level state of the photo-interrupter is set to "L", as described earlier. Thus, the first reference position detection selector 106 acquires and determines the output signal level from the photo-interrupter 102 (S41). When the output signal level of the photo-interrupter 102 is "L", it is determined that the lens unit 101 remains in the stopped state at the stop position S. Therefore, when the output signal level of the photo-interrupter 102 is "L" (S41), the first reference position detection selector 106 selects the unidirectional reference position detector 105 (S43).

When the output signal level of the photo-interrupter 102 is "H", it is determined that after the lens unit 101 is moved to the stop position S, the lens unit 101 is further moved backward from the stop position S due to an external factor such as an impact or the like and stopped out of the valid range (204) of the lens unit stop position. For this reason, when the output signal level of the photo-interrupter 102 is "H" (S41), the first reference position detection selector 106 selects the bidirectional reference position detector 104 (S42).

2.2 Unidirectional Reference Position Detection

Figure 5:
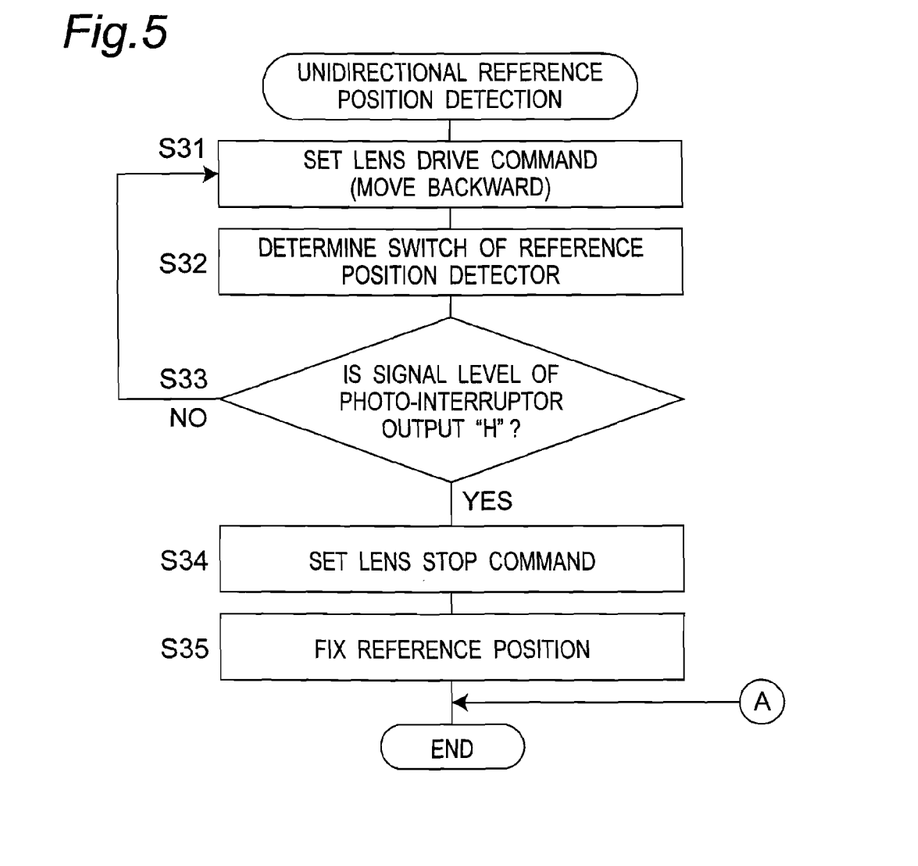
FIG. 5 is a flow chart showing operation of a unidirectional reference position detector (first embodiment).

Referring to a flow chart of FIG. 5, the operation of the unidirectional reference position detector 105 is described in detail. The unidirectional reference position detector 105 moves the lens unit 101 only in one direction of the optical axis direction so as to detect the reference position of the lens. Moving the lens unit 101 only in one direction enables quick detection of the reference position.

First, the unidirectional reference position detector 105 sets a drive command value so as to drive the lens unit 101 backward (in an approaching direction to the imaging device in FIG. 12) (S31). The output signal level of the photo-interrupter 102 is continuously monitored (S33) during the backward driving process of the lens unit 101. The drive command value is continuously set to the value for driving the lens unit 101 backward, until the output signal level state of the photo-interrupter 102 is changed to "H" (S31). Upon receipt of the drive command value from the unidirectional reference position detector 105, the lens drive command unit 112 moves the lens unit 101 backward. During this process, the second reference position detection selector 107 determines whether or not the switching should be made from the unidirectional reference position detector 105 to the bidirectional reference position detector 104 (S32).

When it is determined by the second reference position detection selector 107 that the switching should be made from the unidirectional reference position detector 105 to the bidirectional reference position detector 104, the reference position detector to be operated is switched to the bidirectional reference position detector 104. When it is determined by the second reference position detection selector 107 that the unidirectional reference position detector 105 should be continuously operated, the output signal level of the photo-interrupter 102 is continuously monitored while the lens unit 101 is continuously moved backward (S31 to S33). The operations of the second reference position detection selector 107 will be described later in detail.

When the output signal level of the photo-interrupter 102 is shifted from "L" to "H" (S33), the unidirectional reference position detector 105 sets a drive command value so as to stop the driving of the lens unit 101 (S34), and determines a position at which the lens unit 101 stops as the reference position of the lens unit 101 (S35).

Thereafter, the unidirectional reference position detector 105 stores the determined reference position of the lens unit 101 in the reference position storing unit 114. In a normal lens driving operation, the lens is driven based on the reference position stored in the reference position storing unit 114.

It is understood that, even in the case of inverting the logic of the output signal level ("H" and "L") of the photo-interrupter 102, the detection of the reference position by the unidirectional reference position detector 105 is possible.

By a reference position detector in a conventional position detecting device, the reference position detecting operation is carried out bidirectionally (both of forward direction and backward direction), and thus it takes much time to determine the reference position. In contrast, in accordance with the unidirectional reference position detector 105, since the reference position is detected by moving the lens unit 101 in only one direction, it is possible to shorten the time required for determining the reference position.

2.3 Switching Determination of Reference Position Detector

The operation (step S32) of the second reference position detection selector 107 is described below. The second reference position detection selector 107 determines whether or not the switching from the unidirectional reference position detector 105 to the bidirectional reference position detector 104 should be made during a detecting operation of the reference position by the unidirectional reference position detector 105. The reason for such a switching operation is described below.

Figure 6:
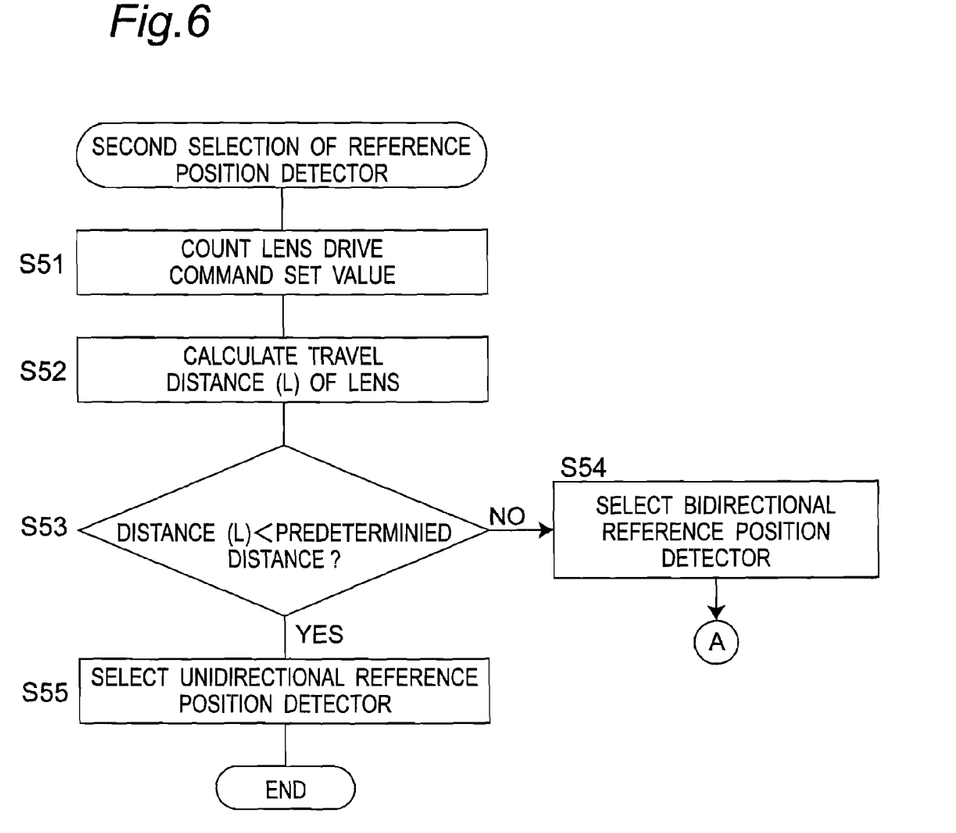
FIG. 6 is a flow chart showing operation of a second reference position detection selector.

As described above, upon start of a position detecting process, the lens unit 101 is supposed to be normally located at a predetermined stop position S. However, when an external influence, such as falling of the imaging apparatus or an impact applied to the imaging apparatus, is given while the lens unit 101 is placed at the stop position S, the lens unit 101 may be sometimes greatly deviated from the stop position. In this case, the unidirectional reference position detector 105 fails to detect an accurate reference position. When the output signal level of the photo-interrupter 102 is "H", the bidirectional reference position detector 104 is selected by the first reference position detection selector 106. However, when the output signal level of the photo-interrupter 102 is "L", the unidirectional reference position detector 105 is selected by the first reference position detection selector 106. Therefore, even when the output signal level of the photo-interrupter 102 is "L", upon determining that the lens unit 101 is greatly deviated from the stop position, the switching is made to the bidirectional reference position detector 104, even if the unidirectional reference position detector 105 is selected. Thus, the second reference position detection selector 107 determines whether the lens unit 101 is deviated from the stop position or not, during the detecting operation by the unidirectional reference position detector 105, and controls the operation so as to make the switching to the bidirectional reference position detector 104 when there is any deviation.

With reference to FIG. 6, the operation of the second reference position detection selector 107 is described below. In the present process, it is determined whether the switching should be made from the unidirectional reference position detector 105 which is once selected to the bidirectional reference position detector 104.

While the command value for driving the lens unit 101 backward is set in the flow chart of FIG. 5 (S31), the second reference position detection selector 107 counts the set value of the lens drive command with a counter (not shown) (S51). The second reference position detection selector 107 calculates a distance L by which the lens unit 101 is moved, based on the counted value N0 (S52). The distance L is obtained from the following equation, where the lens drive command set value is m0.

$$L = N0 \times m0 \tag{1}$$

The second reference position detection selector 107 compares the distance L with a specified distance 203 (S53). When the distance L is not less than the specified distance 203, it is considered that the current situation is that the reference position cannot be detected within the specified distance 203 that has been preliminarily set by taking into consideration of orientation differences and temperature characteristics. In other words, it is considered that an external influence, such as an impact applied forward, is given to the device including the lens unit, with the result that the lens unit 101 is moved forward from the stop position S, and has stopped out of the effective range 204 of the lens-unit stop position. Therefore, when the distance L is not less than the specified distance 203 (S53), the second reference position detection selector 107 generates a determining signal so as to switch the reference position detector to be operated from the unidirectional reference position detector 105 to the bidirectional reference position detector 104, and outputs the resulting signal (S54).

In contrast, when the distance L is less than the specified distance 203 (S53), a determining signal to continuously select the unidirectional reference position detector 105 as the reference position detector to be operated is generated and outputted (S55).

2.4 Bidirectional Reference Position Detection

Figure 7:
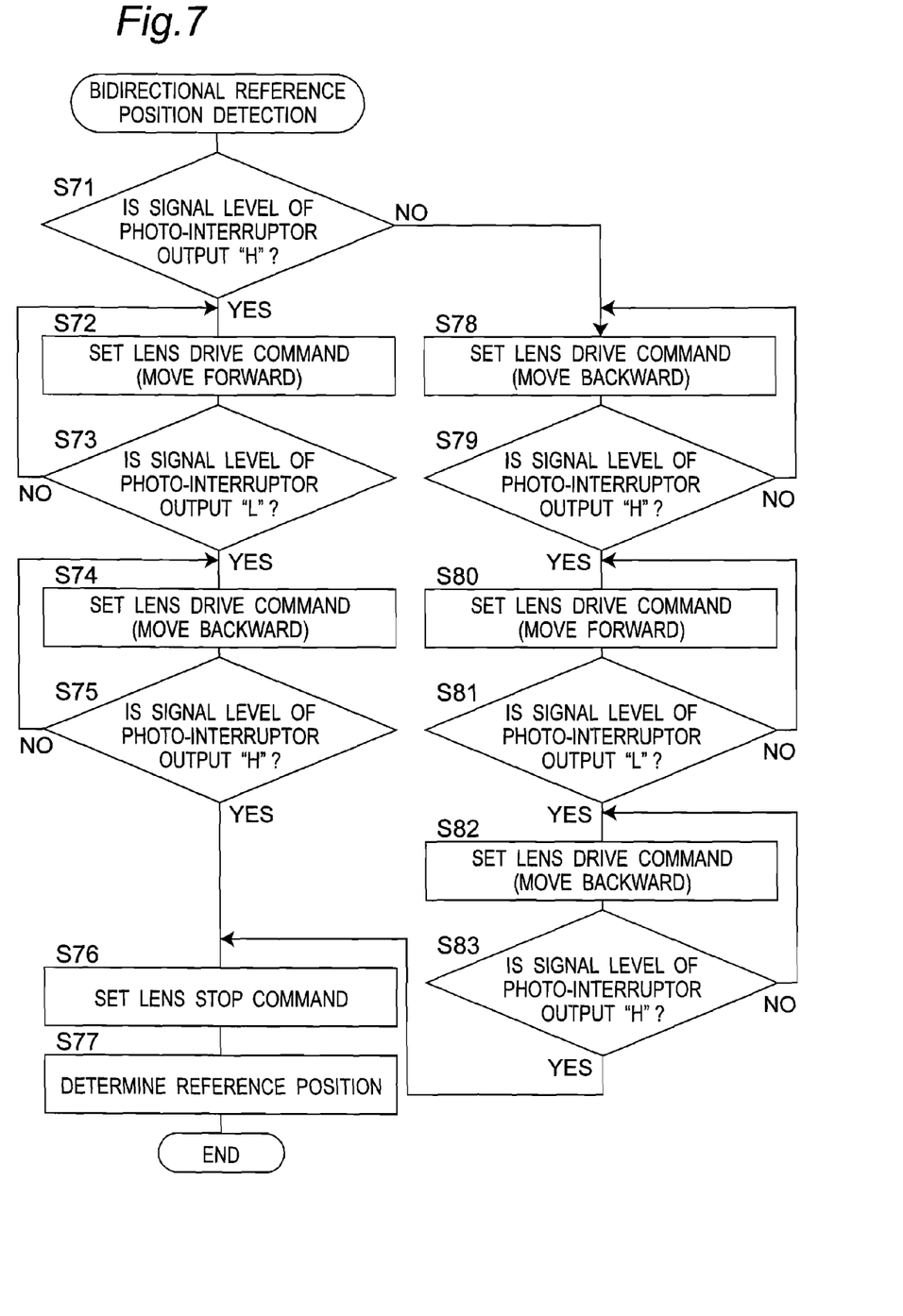
FIG. 7 is a flow chart showing operation of a bidirectional reference position detector (first embodiment).

Referring to a flow chart of FIG. 7, the bidirectional reference position detector 104 is described in detail below. It is supposed that the photo-interrupter 102 is attached to the front edge of a lens barrel. It is noted that, when the photo-interrupter 102 is attached to the rear edge of the lens barrel, it is sufficient to invert the lens driving direction which is indicated below. The bidirectional reference position detector 104 detects the reference position of the lens unit 101 by bidirectionally moving the lens unit 101 in the optical axis direction.

In the bidirectional reference position detecting operation, the lens unit 101 is once moved from a position providing the output signal level of the photo-interrupter 102 of "H" to a position providing the level of "L" (S73, S81). This is to once place the lens unit 101 at or in the vicinity of the stop position S. Thereafter, the lens unit 101 is moved to a position for providing the output signal level of "H" from a position providing the level of "L" so as to determine the reference position. For this reason, the lens unit 101 is driven in two directions.

The bidirectional reference position detector 104 acquires an output signal level of the photo-interrupter 102 (S71). When the acquired output signal level of the photo-interrupter 102 is "H", it sets a drive command value for driving the lens unit 101 forward (S72). During the forward driving operation of the lens unit 101, it keeps monitoring the output signal level of the photo-interrupter 102 (S73). It sets a drive command value for driving the lens unit 101 forward (S72) until the output signal level of the photo-interrupter 102 is changed to "L" (S73). When the output signal level of the photo-interrupter 102 is changed to "L" (S73), it sets a drive command value for driving the lens unit 101 backward (S74). During the backward driving operation of the lens unit 101, it keeps monitoring the output signal level of the photo-interrupter 102 (S75). It sets a drive command value for driving the lens unit 101 backward (S74) until the output signal level of the photo-interrupter 102 is changed to "H". Upon changing the output signal level of the photo-interrupter 102 from "L" to "H", it sets a drive command value for stopping the driving operation of the lens unit 101 (S76), and determines a position at which the lens unit 101 is stopped as the reference position of the lens unit 101 (S77).

When the output signal level of the photo-interrupter 102 acquired upon starting the operation of the bidirectional reference position detector 104 is "L" (S71), it sets a drive command value for driving the lens unit 101 backward (S78). During the backward driving operation of the lens unit 101, it keeps monitoring the output signal level of the photo-interrupter 102 (S79). It sets a drive command value for driving the lens unit 101 backward (S78) until the output signal level of the photo-interrupter 102 is changed to "H". When the output signal level of the photo-interrupter 102 is changed to "H" (S79), it sets a drive command value for driving the lens unit 101 forward (S80). During the forward driving operation of the lens unit 101, it keeps monitoring the output signal level of the photo-interrupter 102 (S81). It sets a drive command value for driving the lens unit 101 forward until the output signal level of the photo-interrupter 102 is changed to "L" (S80). When the output signal level of the photo-interrupter 102 is changed to "L" (S81), it sets a drive command value for driving the lens unit 101 backward (S82). During the backward driving operation of the lens unit 101, it keeps monitoring the output signal level of the photo-interrupter 102 (S83). It sets a drive command value for driving the lens unit 101 backward (S82) until the output signal level of the photo-interrupter 102 is changed to "H" (S83). Then, it sets a drive command value for stopping the driving operation of the lens unit 101 (S76) immediately after the output signal level of the photo-interrupter 102 is changed from "L" to "H", and a position at which the lens unit 101 stops is determined as the reference position of the lens unit 101 (S77).

The reference position of the lens unit 101 determined by the bidirectional reference position detector 104 as described above is stored in the reference position storing unit 114. In a normal lens driving operation, the lens is driven based on the reference position stored in the reference position storing unit 114. Even in the case of inverting the logic of the output signal level state ("H" and "L") of the photo-interrupter 102 in the bidirectional reference position detector 104, the detection of the reference position is available in the same manner as described above.

Accordingly, the bidirectional reference position detector 104 detecting the reference position by moving the lens unit 101 in two directions as described above can determine the reference position accurately, even when the lens unit 101 is shifted from the stop position S prior to activation of the position detecting device due to an external influence such as falling of the apparatus or an impact applied to the apparatus.

3. Summary

As described above, according to the present embodiment, upon start of a reference position detecting operation, the lens unit 101 is moved to the predetermined stop position S. When it is determined that the lens unit 101 is located at the stop position S, the lens unit 101 is moved only in one direction to detect a reference position. Since, the lens unit 101 is moved only in one direction upon detecting the reference position, it is possible to shorten the period of time required for determining the reference position in comparison with a conventional system. Even when the lens unit 101 is deviated from the stop position S due to an external influence such as an application of an impact, the reference position can be detected by moving the lens unit 101 in two directions. Thus, it becomes possible to positively detect the reference position even upon occurrence of an external influence such as an impact.

Second Embodiment

The second embodiment of a lens position detecting device of the present invention is described below. In the bidirectional reference position detector 104 and the unidirectional reference position detector 105 of the lens position detecting device 100 of the first embodiment, after the lens unit 101 is stopped by a command for stopping the lens unit (referred to as "lens stop command"), the reference position is determined based on the stop position. In contrast, in the lens position detecting device of the present embodiment, the detection of the reference position is carried out without stopping the lens unit 101. More specifically, the lens drive command is provided for a predetermined unit distance. Upon detection of a passage through a reference position during a moving process within a certain distance unit, the position at the time of the passage is recorded as reference position. With this arrangement, even while the lens is moving, the reference position can be determined so that it becomes possible to further shorten the period of time required for the reference position detection, and also to achieve an accurate reference position detection.

Figure 8:
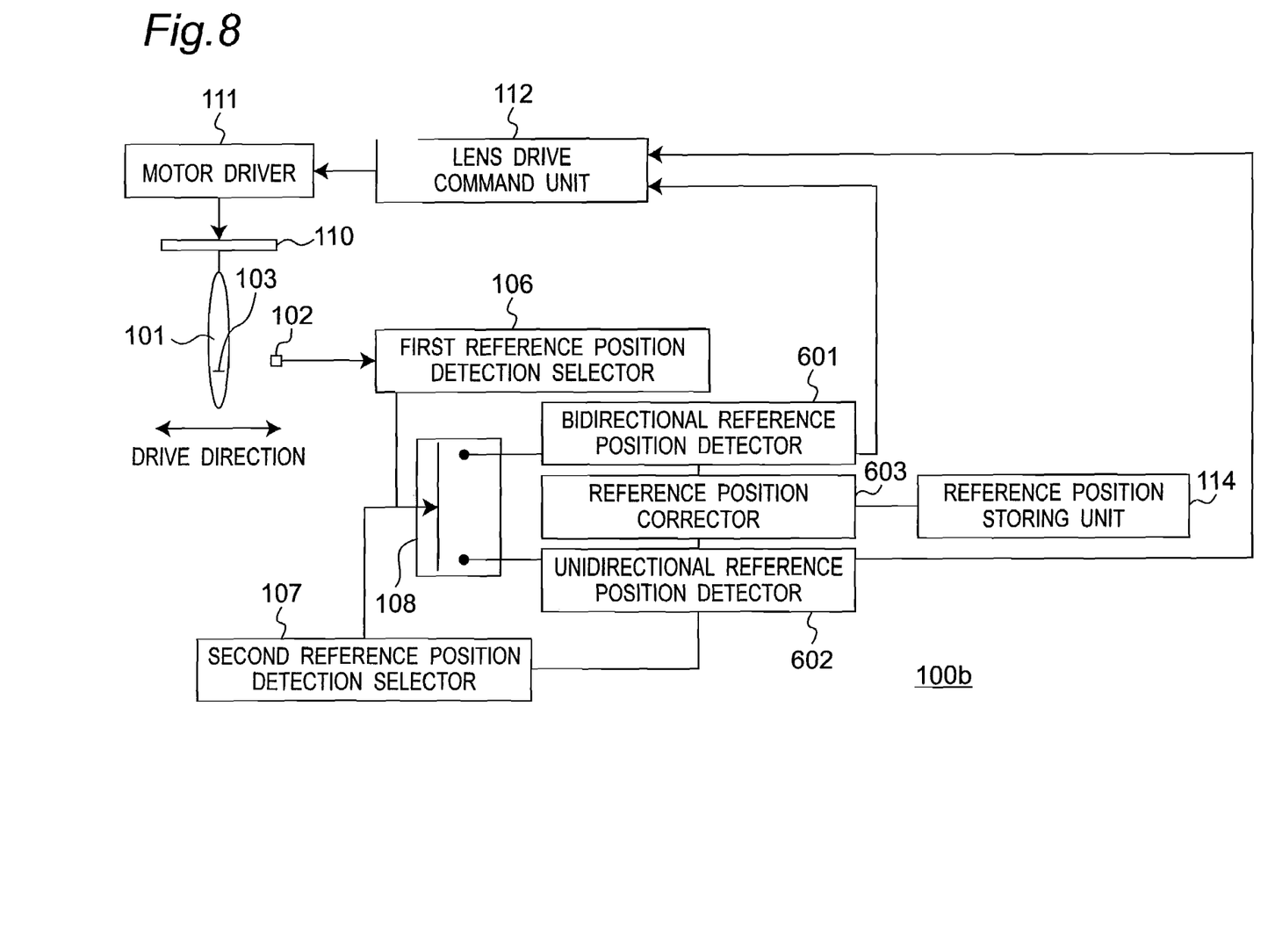
FIG. 8 is a block diagram showing an imaging apparatus including a position detecting device in accordance with a second embodiment of the present invention.

FIG. 8 shows a structure of an imaging apparatus including a lens position detecting device in accordance with the second embodiment of the present invention. A lens position detecting device 100*b* of the present embodiment further includes a reference position corrector 603 in addition to the structure of the position detecting device 100 shown in the first embodiment. Moreover, a bidirectional reference position detector 601 that carries out a reference position detection in two directions and a unidirectional reference position detector 602 that carries out a reference position detection only in one direction in the position detecting device 100*b* of the present embodiment basically have the same functions as those of the first embodiment. However, some of the functions are different from each other. The structures and operations of the present embodiment that are different from those of the first embodiment are described below.

1. Bidirectional Reference Position Detection

Figure 9:
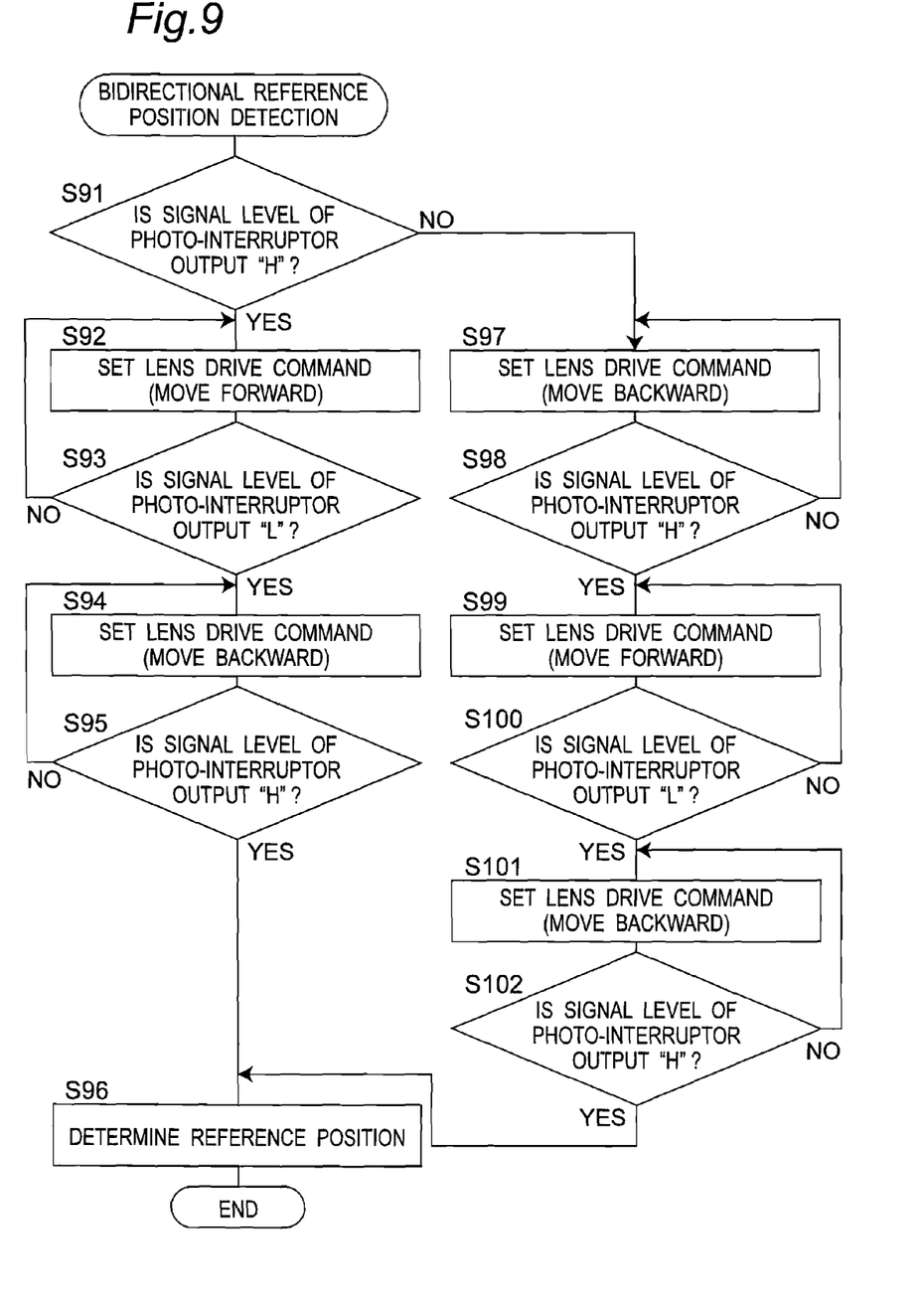
FIG. 9 is a flow chart showing operation of a bidirectional reference position detector (second embodiment).

Referring to a flow chart of FIG. 9, the operation of the bidirectional reference position detector 601 of the present embodiment is described in detail.

The bidirectional reference position detector 601 acquires an output signal level of the photo-interrupter 102 (S91).

When the acquired output signal level of the photo-interrupter 102 is "H", the bidirectional reference position detector 601 sets a drive command value for driving the lens unit 101 forward (S92). During the forward driving operation of the lens unit 101, it keeps monitoring the output signal level of the photo-interrupter 102 (S93). It sets a drive command value for driving the lens unit 101 forward (S92) until the output signal level of the photo-interrupter 102 is changed to "L". When the output signal level of the photo-interrupter 102 is changed to "L" (S93), it sets a drive command value for driving the lens unit 101 backward (S94). During the backward driving operation of the lens unit 101, it keeps monitoring the output signal level of the photo-interrupter 102 (S95). It sets a drive command value for driving the lens unit 101 backward (S94) until the output signal level of the photo-interrupter 102 is changed to "H". Upon changing the output signal level of the photo-interrupter 102 from "L" to "H", the bidirectional reference position detector 601 determines a position of the lens unit 101 at this time as the reference position of the lens unit 101 (S96).

When the output signal level of the photo-interrupter 102 acquired upon start of the operation of the bidirectional reference position detector 601 is "L" (S91), it sets a drive command value for driving the lens unit 101 backward (S97). During the backward driving operation of the lens unit 101, it keeps monitoring the output signal level of the photo-interrupter 102 (S98). It sets a drive command value for driving the lens unit 101 backward (S97) until the output signal level of the photo-interrupter 102 is changed to "H" (S98). When the output signal level of the photo-interrupter 102 is changed to "H" (S98), it sets a drive command value for driving the lens unit 101 forward (S99). During the forward driving operation of the lens unit 101, it keeps monitoring the output signal level of the photo-interrupter 102 (S100). Moreover, it sets a drive command value for driving the lens unit 101 forward until the output signal level of the photo-interrupter 102 is changed to "L" (S99). When the output signal level of the photo-interrupter 102 is changed to "L" (S100), it sets a drive command value for driving the lens unit 101 backward (S101). During the backward driving operation of the lens unit 101, it keeps monitoring the output signal level of the photo-interrupter 102 (S102). It sets a drive command value for driving the lens unit 101 backward (S101) until the output signal level of the photo-interrupter 102 is changed to "H". The bidirectional reference position detector 601 determines a position of the lens unit 101 when the output signal level of the photo-interrupter 102 is changed from "L" to "H" (more precisely, immediately after the change), as the reference position of the lens unit 101 (S96). The value of the reference position is temporarily stored in a predetermined storing unit.

2. Mono-directional Reference Position Detection

Figure 10:
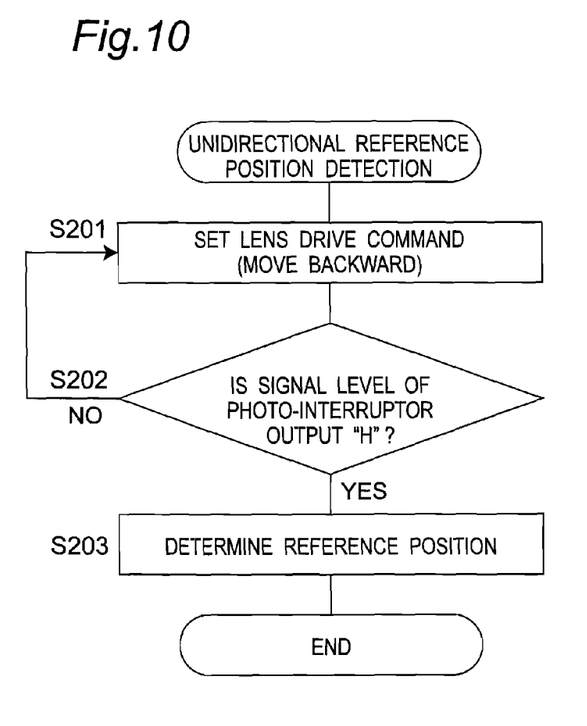
FIG. 10 is a flow chart showing operation of a unidirectional reference position detector (second embodiment).

Referring to a flow chart of FIG. 10, the operation of the unidirectional reference position detector 602 is described below.

The unidirectional reference position detector 602 sets a drive command value for driving the lens unit 101 backward (S201). During the backward driving operation of the lens unit 101, the unidirectional reference position detector 602 continuously monitors the output signal level of the photo-interrupter 102 (S202). The unidirectional reference position detector 602 sets a drive command value for driving the lens unit 102 backward (S201) until the output signal level of the photo-interrupter 102 is changed to "H" (S202). The unidirectional reference position detector 602 determines a position of the lens unit 101 when the output signal level of the photo-interrupter 102 is changed from "L" to "H" (more precisely, immediately after the change) as the reference position of the lens unit 101 (S203). The value of the reference position is temporarily stored in a predetermined storing unit.

Even in the case of inverting the logic of the output signal level ("H" and "L") of the photo-interrupter 102 in the operations of the bidirectional reference position detector 601 and the unidirectional reference position detector 602, the detection of the reference position is available in the same manner as described above.

3. Reference Position Correction

Figure 11:
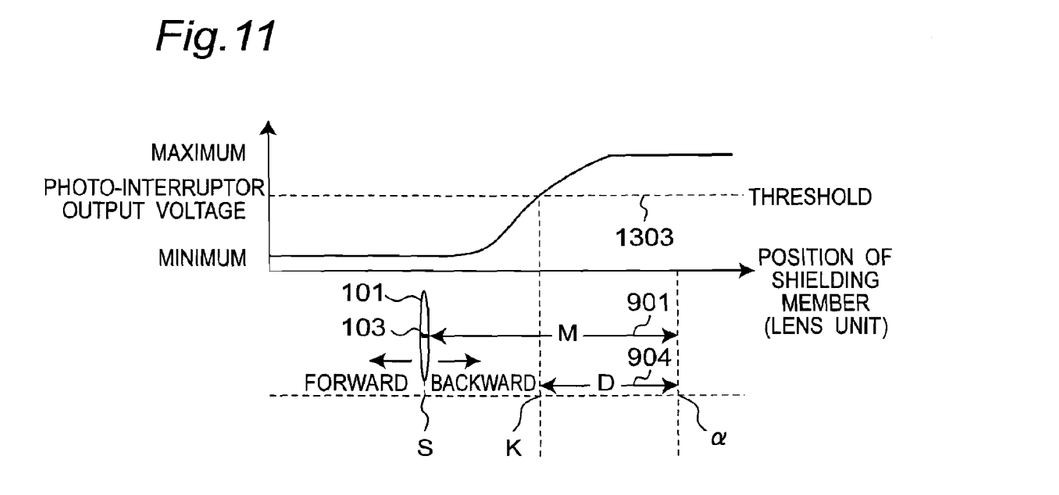
FIG. 11 is a diagram describing operation of a reference position corrector (second embodiment).

The reference position is determined by the bidirectional reference position detector 601 and the unidirectional reference position detector 602 as described above. However, the reference position $\alpha$ thus determined has a deviation from the reference position to be originally desired to obtain. That is, the bidirectional reference position detector 601 and the unidirectional reference position detector 602 are designed to determine a position when the output signal level of the photo-interrupter 102 is switched from "L" to "H", as the reference position, and store the resulting position in a predetermined storing unit. In an actual operation, however, it is impossible to determine the position of the lens unit 101 at the moment the output signal level of the photo-interrupter 102 is switched from "L" to "H". Thus there is a time lag between the timing at which the logic of the output signal level is inverted and the timing at which the reference position is determined. For this reason, in an actual operation, the lens unit 101 moves by a certain distance, from the moment at which the output signal level is switched until the reference position is been determined. That is, as shown in FIG. 11, a deviation occurs between the value $\alpha$ that is a position actually determined as the reference position and the original reference position K at which the logic of the output signal level is inverted. Therefore, in the present embodiment, the reference position corrector 603 corrects the reference position $\alpha$ determined by the reference position detector 601 and 602 to obtain a more accurate reference position. The operation of the reference position corrector 603 is described in detail below.

When M (distance 901) is a distance which the lens unit 101 moves according to a lens drive command value m being output for a certain period of time t, the relationship indicated by the following equation holds:

$$M = m \times t \qquad (2)$$

In FIG. 11, the lens unit 101 moves from the first stop position S due to a lens drive command corresponding to the drive command value m. When the photo-interrupter output signal level of the photo-interrupter 102 exceeds a threshold value 1303 due to the movement of the lens unit and switches from "L" to "H", the reference position determined by the bidirectional reference position detector 601 or the unidirectional reference position detector 602 corresponds to the position $\alpha$. Moreover, a lens unit position at the moment the output signal level of the photo-interrupter 102 exceeds a threshold value 1303 to switch from "L" to "H" is the position K.

Originally, it is appropriate to set the position K, obtained at the moment the output signal level of the photo-interrupter 102 exceeds the threshold value 1303 to switch from "L" to "H", as the reference position. However, there is a difference between the position K that should be originally determined as the reference position and the reference position $\alpha$ that is determined by the bidirectional reference position detector 601 and the unidirectional reference position detector 602.

When a difference between the reference positions, that is, an amount of deviation, is D, the following equation is obtained.

$$D=|\alpha-K| \quad (3)$$

The reference position corrector 603 corrects this amount of deviation D. The method for calculating the amount of deviation D (904) is described below. The time is measured by a timer or the like during the driving operation of the lens unit 101 with the drive command value m. The time during which the lens unit 101 moves from the stop position S to the position K is tK, and the time during which the lens unit 101 moves from the stop position S to the reference position α is tα.

$$t=t\alpha \quad (4)$$

Consequently, from equation (2) and equation (4), the distance M from the stop position S to the reference position α is represented as follows.

$$M=m \times t\alpha=|\alpha-S| \quad (5)$$

Moreover, the time tD during which the lens unit 101 moves through the section 904 with the deviation amount D is represented by the following equation.

$$tD=t\alpha-tK \quad (6)$$

Since the lens drive command value used for moving the lens unit 101 through the section 904 with the deviation amount D is m, the deviation amount D is represented by the following equation.

$$D=m \times (t\alpha-tK) \quad (7)$$

Therefore, the position K to be determined originally as the reference position can be found from the following equation:

$$K=|M-D| \quad (8)$$

The reference position corrector 603 corrects the reference position α determined by the reference position detector 601 or 602 by obtaining the position K in accordance with equation (8). The reference position K (reference position after correction) thus corrected is stored in the reference position storing unit 114. In the succeeding lens driving operation, the lens is driven based on the corrected reference position stored in the reference position storing unit 114.

According to the present embodiment, the operation relating to the switching from the unidirectional reference position detector 602 to the bidirectional reference position detector 601 during the operation of the unidirectional reference position detector 602 is the same as those of the first embodiment.

4. Summary

As described above, when the lens drive command is provided based on a predetermined unit distance for moving the lens unit, a position when the lens unit just passes through the reference position is recorded, and the amount of deviation D to be corrected is calculated based on the recorded position. With this arrangement, it is possible to determine an accurate reference position, and consequently further shorten the time required for detecting the reference position and achieve an accurate reference position detecting operation.

INDUSTRIAL APPLICABILITY

The present invention which can carry out calculations for the reference position of a lens accurately in a short time, is effectively applicable to an imaging apparatus, such as a video camera and a digital still camera, that require a lens position controlling operation.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2007-326913, filed on Dec. 19, 2008, which is expressly incorporated herein by reference in its entirety.

What is claimed is:

1. A reference position detecting device for detecting a reference position of a lens which provides a reference for moving the lens, said reference position detecting device comprising:
    a lens movable in an optical axis direction;
    a lens driver configured to move said lens in the optical axis direction;
    a lens drive command unit for outputting a drive command to said lens driver;
    a position detector for detecting whether said lens is located at a predetermined position; and
    a first reference position detector configured to move said lens to a first position, the first position being related to the reference position of said lens, configured to receive an output signal from said position detector while moving said lens in one direction toward the reference position from the first position, and configured to detect the reference position of said lens based on the output signal.

2. The reference position detecting device according to claim 1, further comprising:
    a second reference position detector configured to move said lens to a second position in one direction along the optical axis direction, configured to receive an output signal from said position detector while moving said lens in a reverse direction to the one direction, and configured to detect a reference position of said lens based on the output signal; and
    a selector configured to select one of the first reference position detector and the second reference position detector as the reference position detector to be operated.

3. The reference position detecting device according to claim 1, wherein said first reference position detector stops said lens when the level of the output signal changes in a predetermined manner, and detects the stop position as the reference position.

4. The reference position detecting device according to claim 1, wherein said position detector is a photo-interrupter configured to receive light emitted from a light emitting element with a light receiving element, and configured to detect a physical position in the optical axis direction of said lens based on a change in a state of light-receiving.

5. The reference position detecting device according to claim 4, wherein the first position is set based on characteristics of said lens and detection characteristics of said photo-interrupter.

6. The reference position detecting device according to claim 1, further comprising:
    a reference position corrector that corrects the reference position of said lens based on the detected reference position and the command value of said lens drive command unit.

7. A reference position detecting device for detecting a reference position of a lens which provides a reference for moving the lens, said reference position detecting device, comprising:

a lens movable in an optical axis direction;

a lens driver configured to move said lens in the optical axis direction;

a lens drive command unit for outputting a drive command to said lens driver;

a position detector for detecting whether said lens is located at a predetermined position;

a reference position detector configured to move said lens to a first position, the first position being related to the reference position of said lens, configured to receive an output signal from said position detector while moving said lens toward the reference position from the first position, and configured to detect the reference position of said lens based on the output signal; and a reference position corrector configured to correct the reference position of said lens based on the detected reference position and the command value of said lens drive command unit.

* * * * *